Patented Sept. 17, 1940

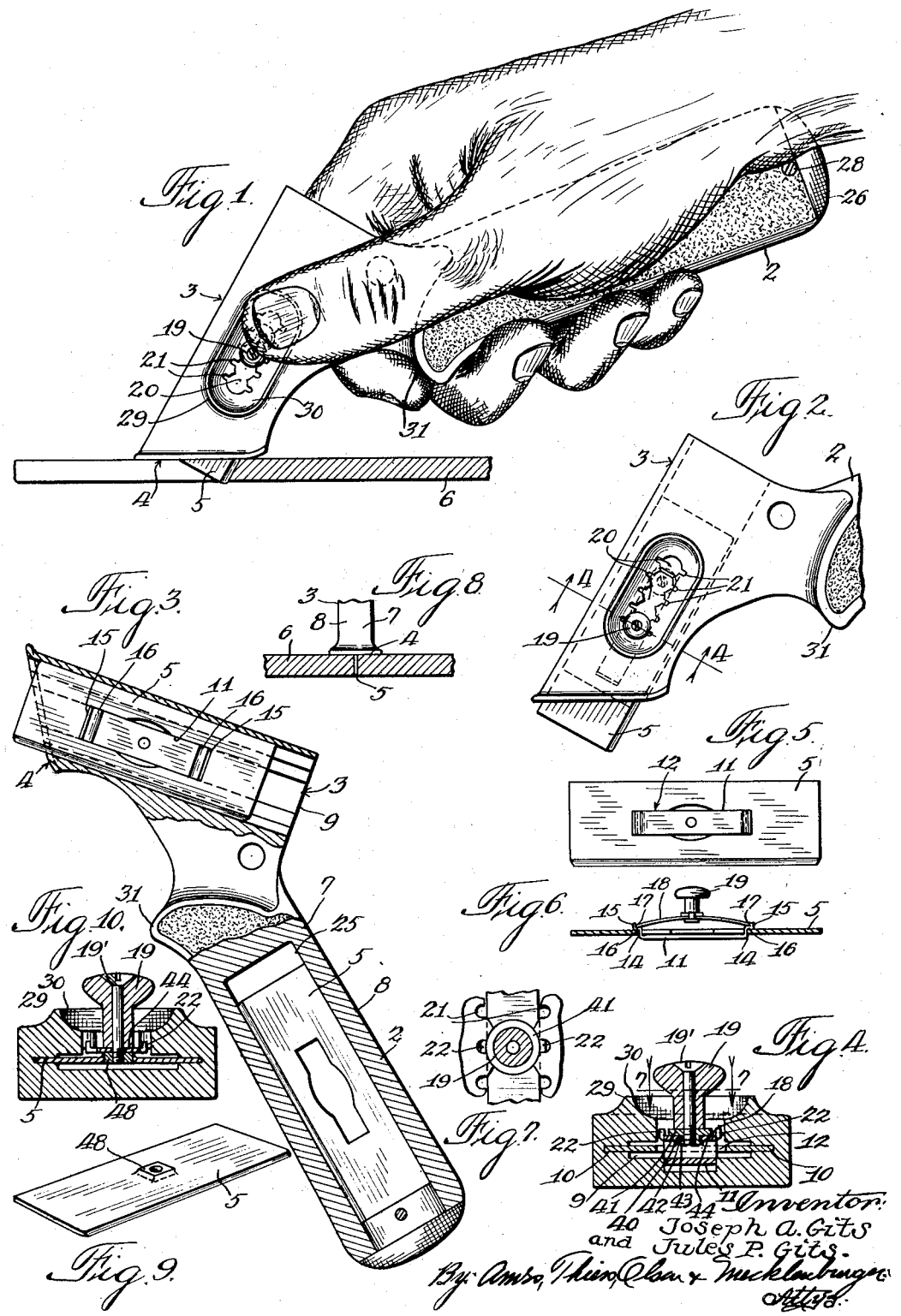

2,215,216

UNITED STATES PATENT OFFICE 2,215,216

CUTTING IMPLEMENT

Joseph A. Gits and Jules P. Gits, Chicago, Ill.

Application December 14, 1936, Serial No. 115,768

6 Claims. (Cl. 30—162)

The invention relates to cutting implements and more particularly to cutting implements that are generally adapted for use in opening cardboard cartons, cutting linoleum, and the like.

An object of the invention is to provide a new and improved cutting implement of the type described that can be readily gripped by the operator, and, while so gripped, be adjusted at any time to cut at different depths, it being a feature of the present invention that the adjustment of the blade to cut at different depths may be made, if so desired, after penetration of the blade and during the cutting.

A further object of the invention is to provide a new and improved cutting implement of the type described having an adjustable button connected to the blade and engageable by the thumb, which button may be readily operated by the thumb while the hand grips the cutting implement, so that the blade may be quickly adjusted to cut at different depths even though the blade may have already penetrated the material.

A still further object of the invention is to provide a cutting implement of this type that is simple, inexpensive, and sturdy in construction.

A still further object is to provide a cutting implement having a substantially flat work-engaging surface formed at one end as a part thereof without requiring additional parts, and which maintains the cutting blade in proper cutting relation to the work and does not limit the use of the device to any particular class of work.

Further objects and advantages of the invention will be apparent from the following description when taken in connection with the accompanying drawing, which forms a part hereof.

In the drawing:

Figure 1 illustrates a cutting implement embodying the invention held by the hand to show how the thumb may be used to effect adjustment of the cutting blade during cutting operation without releasing the grip of the hand upon the device;

Fig. 2 illustrates the portion of the device carrying the cutting blade and the mechanism effecting adjustment thereof;

Fig. 3 is a view of the device showing the handle and the blade housing in section;

Fig. 4 is a transverse section taken on line 4—4 of Fig. 2;

Fig. 5 illustrates the cutting blade and a portion of the mechanism used to adjust the same;

Fig. 6 is a longitudinal section through the cutting blade to show the manner of securing the cutting blade and the operating button in proper relation;

Fig. 7 is a section taken on line 7—7 of Fig. 4;

Fig. 8 is a fragmentary detail front view illustrating the work-engaging surface of the cutting implement in cutting relation with the work;

Fig. 9 is a view of a modified form of cutting blade; and

Fig. 10 is a transverse section similar to Fig. 4 but illustrating the attachment between the operating button and the cutting blade when the blade shown in Fig. 9 is employed.

The cutting implement illustrated in the drawing comprises a handle 2 and a blade housing 3. The fore end of blade housing 3 is so formed that a substantially flat work-engaging surface 4 is provided. A cutting blade 5 is carried by housing 3 and is adapted to be adjustably projected therefrom through work-engaging surface 4 to penetrate the work 6 at different depths. Work-engaging surface 4 keeps cutting blade 5 in proper working relation to the material being cut. As illustrated, cutting blade 5 is adapted to enter the work, say at a 60° angle to the normal, which relation is maintained if the operator keeps work-engaging surface 4 pressed against the work as illustrated in Figs. 1 and 8.

Handle 2 and blade housing 3 are preferably formed as a single integral one-piece unit, but this is not essential to the invention. Housing 3 is provided with a compartment 9. A cutting blade 5 is adapted to be adjustably projected from compartment 9 in cutting relation. Compartment 9 is preferably stepped to be of different widths. The width of this compartment at 10 is substantially equal to the width of cutting blade 5. Means are provided to adjustably move cutting blade 5 in chamber 9 so as to project the cutting blade 5 therefrom at different distances in order that the projecting tip of cutting blade 5 may penetrate the work and cut at different depths.

This blade adjusting means is preferably in the form of a spring strip 11 adapted to be seated in a rectangular opening 12 in cutting blade 5. Spring strip 11 is preferably flanged at each end as indicated at 14, so that it may be held seated in rectangular opening 12. End flange construction 14 includes an outer vertical flange 15 and an intermediate horizontal flange 16. This flange construction 14 makes strip 11 substantially U-shape in cross section and of a length between horizontal flanges 16 that is slightly greater than the length of rectangular opening 12. Consequently, the intermediate portion of strip 11 may pass through opening 12 to permit horizontal flanges 16 to seat upon the end edges of this opening. Vertical flanges 15, together with horizontal flanges 16, provides a seat for the ends 17 of a bowed spring 18 adapted to carry a manually operable button 19 with ends 17 of bowed spring 18 abutting against end flanges 15. The bowed spring 18 keeps button 19 in extended position away from cutting blade 5, as indicated in Fig. 6.

Button 19 serves as the manually operable means for adjustably moving cutting blade 5 in compartment 9 and may be so located with respect to handle 2 as to be capable of actuation by the thumb of the hand gripping the handle 2 without releasing this grip upon the handle. I find this feature to be extremely advantageous from the operating standpoint of the cutting implement because the operator may adjust the blade to a position for a different cutting depth while reaching for another carton to cut or during the cutting operation without any delay or loss of time. As a manually operable element, button 19 may be of any desired construction, which, as shown, includes a screw 19' which is threaded at its lower end and enters bowed spring 18 which holds the manually operable element and its parts in assembled relation. One side of housing 3 is provided with a slot 20 having a series of notches 21 along each edge thereof. Notches 21 are aligned in pairs on opposite sides of opening 20. The threaded end of screw 19' enters a threaded bushing 40 formed into a large collar 41 at the top, a reduced portion 42, and a lower disk 43. About reduced portion 42 and between collar 41 and disk 43, a member 44 having oppositely projecting lugs 22 is disposed. Projecting lugs 22 are adapted to align with and engage in notches 21 of the respective pair. Bowed spring 18 holds lugs 22 in these notches 21 and thereby lock the blade 5 from movement into or out of compartment 9. Bowed spring 18 receives the lower threaded end of screw 19'. When button 19 is depressed against the spring action of bowed spring 18, lugs 22 are moved inwardly and out of engagement with notches 21. While button 19 is being so held in depressed position, it may be moved along slot 20 so as to move the blade forwardly and backwardly in compartment 9. Consequently, the blade 5 may be easily adjusted and be projected at different predetermined distances to effect cutting at different depths.

It will be noted that the parts employed to move cutting blade 5 in adjustable relation in compartment 9 are few and simple and easily assembled.

In the assembly, compartment 9 is accessible by blade 5 from one end. Blade 5 is adapted to be inserted into compartment 9 from one end and is adapted to have strip 11 and bowed spring 18 properly assembled in opening 12 therein before this insertion in compartment 9. Blade 5, strip 11 and bowed spring 18 are slid into this compartment 9 from one end as a unit. Screw 19' of button 19 is then threaded into bushing 40, carried by bowed spring 18.

If it is so desired, the handle 2 may be cored to provide a storage chamber 25 for extra cutting blades, which storage chamber may be formed in handle 2. Chamber 25 may extend to the end of handle 2 and a cap 26 may be secured in this end of chamber 25 to hold the extra cutting blades in this chamber.

As previously stated, button 19 extends outwardly from one side of blade housing 3 so as to lie preferably in the position where the thumb is brought to rest when the hand grips about handle 2. To facilitate positioning of the thumb in the proper location at the side of blade housing 3, raised portion 29 has been provided and is dished somewhat, as indicated at 30, to guide the thumb in keeping it engaged with button 19. It is found that the hand may grip handle 2 more conveniently and remain in proper position so as to keep the thumb against button 19, if a shoulder 31 is formed at the front end of handle 2 so that the forefinger may rest thereagainst.

Figures 9 and 10 illustrate a slightly modified embodiment of the invention. Cutting blade 5 is preferably provided with an enlargement which may be a brazed nut 48 that is internally threaded to receive the lower end of screw 19' of button 19. Member 44 having lugs 22 may lie between button 19 and brazed nut 48. This arrangement permits eliminating strip 11 and bowed spring 19, because we find that there may be sufficient resiliency in cutting blades of the type that may be used in the device, which may be utilized in holding lugs 22 in notches 21 to lock the blade from movement in compartment 9.

Button 19 can be as readily depressed to release lugs 22 from notches 21 as in the form shown in the previous figures, so that it may be moved along slot 20 so as to move the blade forwardly and backwardly in compartment 9.

From the foregoing description, it will be observed that cutting blade 2 is adapted to move at an oblique angle with respect to the axis of handle 2. The manually operable button 19 may be then advantageously located along the outside of blade housing 3 in a position permitting engagement by the thumb and movement in slot 20 so as to effect various adjustments of the blade without disturbing the grip of the hand upon handle 2. In the receiving rooms of the shipping departments of many large companies, hundreds of cartons are received each day that are of different sizes and constructed of cardboard of different thicknesses. The attendant in charge of the receiving room is required, therefore, to effect cuts of different depths in order to open all cartons received by him. On the other hand, the attendant may open a carton at one side where there is a double fold of cardboard. This may not be noticed by the attendant until he starts opening the carton—that is, after he has effected penetration of his cutting implement and finds that the cutting blade does not penetrate completely through the carton wall at the side he is opening. Cartons must be opened carefully, in a great many instances, to prevent the cutting blade from penetrating beyond the thickness of the cardboard so as not to cut or mutilate the contents in the cartons. It is very desirable, therefore, that the cutting blade 5 project a distance equal only to the thickness of the cardboard that is being cut, whether of a single or double thickness, as the case may be. In order to facilitate the work of the attendant without causing undue delay in his operations, it is highly advantageous that cutting blade 5 may be adjusted while the cut is being made, so that it will not be necessary to delay or waste the time that may be required to remove cutting blade 5 from the carton to effect an adjustment necessary to provide the proper depth of cut. On the other hand, it is desirable quickly to effect this adjustment of the cutting blade, whether penetrating the work or not penetrating the work, to secure the proper depth of cut during the cutting operation and without requiring a readjustment of the hand about handle 2. It will be noted, therefore, that the present invention provides a cutting implement that may be easily gripped by the hand and which has an adjustable button 19 in a position where the thumb normally rests against the cutting implement so that the thumb may be used instantly and at any time to adjust the depth of cut being made by cutting blade 5.

The cutting implement shown herein is made of a few simple parts that are sturdy in construction and inexpensive to manufacture. The few simple parts give the device a longer life and permit it to be used wherever this type of cutting is necessary, irrespective of whether it is to open cardboard cartons, or cut linoleum or other material. The substantially flat work-engaging surface 4 allows the cutting implement shown herein to effect a cut along any line upon the carton (if a carton is being opened) and does not restrict the cutting operation to the edges only. If the work-engaging surface 4 is maintained firmly against the work, the projecting edge of cutting blade 5 will penetrate the proper distance and be held at the proper angle to effect the most efficient cut. Any series of adjustments may be provided for blade 5. Blade housing 3 may be made in different sizes and the number of notches 21 in slot 20 may be varied so that the blade may be adjusted to any number of positions to effect cuts of different depths.

Without further elaboration, the foregoing will so fully explain the gist of our invention that others, by applying current knowledge, may readily adopt the same for use under varying conditions of service without eliminating certain features which may properly be said to constitute the essential items of novelty involved, which items are intended to be defined and secured to us by the following claims.

We claim:

1. A cutting implement of the type described comprising a handle and a blade housing extending from said handle, a compartment in said housing, a cutting blade projecting from said compartment, manually operable means projecting from said housing for adjustably moving said blade at predetermined distances from said compartment to effect cutting operations at different depths, and means for connecting said blade and said manually operable means whereby said blade will be locked in its different positions of adjustment comprising a pair of shoulders carried by and disposed intermediate the ends of said blade, a spring member having its ends seated against said shoulders and carrying said manually operable means, and locking lugs on said manually operable means adapted to be released from locking position by depressing said spring member when said manually operable means is actuated to move said blade.

2. A cutting implement of the type described comprising a housing, a blade slidable therein and adapted to be projected beyond one end thereof, there being a slot in said housing and a slot in said blade, said slots extending in a direction substantially lengthwise of said housing and said blade, resilient means connected with said blade, said resilient means including a spring member seated in said blade slot, a second spring member seated in said first spring member, and a manually operable member connected to said second spring member and projecting from said housing slot whereby said second spring member may be deflected and said blade moved with respect to said housing.

3. A cutting implement of the type described comprising a housing, a cutting blade slidable therein, means for adjustably moving said cutting blade to project beyond one edge thereof, said means being connected with said blade, there being a slot in said blade and a slot in said housing, said blade adjusting means including a member seated in said blade slot, a spring seated in said member, a manually operable element attached to said spring and projecting through said housing slot whereby said spring member may be deflected and said blade moved with respect to said housing, and means for locking said blade against movement when said spring is not deflected.

4. A cutting implement of the type described comprising a housing, a cutting blade slidable therein, means for adjustably moving said cutting blade to project beyond one edge thereof, said means being connected with said blade, there being a slot in said housing, said blade adjusting means including shoulders carried by said blade, a bowed spring having its ends seated upon said shoulders, and a manually operable member projecting through said housing slot whereby said bowed spring may be deflected and said blade moved with respect to said housing.

5. A cutting implement of the type described comprising a housing, a cutting blade slidable therein, means for adjustably moving said cutting blade to project beyond one edge thereof, said means including an inverted bowed spring carried by said blade intermediate its ends, shoulders carried by said blade upon which the ends of said blade are seated, a manually operable member attached to said spring, there being a slot in said housing through which said manually operable member projects, and locking means adapted to be disabled by pressure on said manually operable member whereby said spring will be deflected and said blade moved with respect to said housing.

6. A cutting implement of the type described comprising a housing having a chamber therein, a cutting blade slidable in said chamber, said blade having a slot therein, said chamber having a recess on one side of said blade substantially equal to the width of said slot, a U-shaped member seated in said slot and having a portion thereof adapted to ride in said recess, the ends of said member resting upon opposed edges of said slot and providing opposed shoulders, a spring resting upon said shoulders, and a manually operable member for flexing said spring whereby said blade may be moved in said chamber.

JOSEPH A. GITS.
JULES P. GITS.